United States Patent [19]
Stecklow

[11] Patent Number: 5,649,616
[45] Date of Patent: Jul. 22, 1997

[54] CONVEYOR CHAIN CLEANING APPARATUS

[76] Inventor: Richard L. Stecklow, 7A Jules Ln., New Brunswick, N.J. 08901

[21] Appl. No.: 630,476

[22] Filed: Apr. 11, 1996

[51] Int. Cl.$^6$ ............................................... B65G 45/18
[52] U.S. Cl. ........................................ 198/496; 198/495
[58] Field of Search ........................... 198/495, 496

[56] References Cited

U.S. PATENT DOCUMENTS

| | | | |
|---|---|---|---|
| 1,543,411 | 6/1925 | Wittig | 198/495 |
| 1,793,246 | 2/1931 | Philips . | |
| 2,216,304 | 10/1940 | Thornton | 198/230 |
| 2,855,094 | 10/1958 | Zebarth | 198/230 |
| 3,578,151 | 5/1971 | Crawford | 198/230 |
| 3,819,032 | 6/1974 | Preuss et al. | 198/180 |
| 3,998,321 | 12/1976 | Schultz | 198/495 |
| 4,960,200 | 10/1990 | Pierce | 198/495 |
| 5,031,750 | 7/1991 | Barnes | 198/495 |
| 5,058,728 | 10/1991 | Leiweke et al. | 198/495 |
| 5,355,992 | 10/1994 | Baig et al. | 198/495 |
| 5,372,242 | 12/1994 | King | 198/495 |

FOREIGN PATENT DOCUMENTS

| | | | |
|---|---|---|---|
| 0448080 | 9/1991 | European Pat. Off. | 198/495 |
| 3629415 | 3/1988 | Germany | 198/495 |
| 53-574 | 1/1978 | Japan | 148/495 |
| 0051183 | 4/1979 | Japan | 198/495 |
| 0914432 | 3/1982 | U.S.S.R. | 198/495 |
| 2082133 | 3/1982 | United Kingdom | 198/495 |

*Primary Examiner*—James R. Bidwell
*Attorney, Agent, or Firm*—Jacobson, Price, Holman, & Stern, PLLC

[57] ABSTRACT

A plastic conveyor chain cleaning apparatus in which the conveying chain is subjected to a series of cleaning procedures including high pressure solvent spray nozzles, sets of cleaning brushes to subject all surfaces of the conveyor chain to scrubbing action, additional high pressure solvent spray nozzles, a solvent bath and air nozzles for drying the chain. The cleaning brushes include a roller arrangement requiring the conveyor chain to move in a serpentine path to subject surfaces of the conveyor chain to more effective cleaning by cleaning brushes engaged with the conveying surface of the chain while in concave and convex conditions. The apparatus also utilizes additional sets of driven brushes to provide a scrubbing action on all surfaces of the chain and utilizes high pressure solvent spray to blast the surfaces of the chain to remove film and sediment. The brushes are operated by a single motor and are kept clean during use by the solvent. The air nozzles provide a drying action to minimize the amount of solvent left on the chain during the cleaning operation.

18 Claims, 4 Drawing Sheets

CONVEYOR CHAIN CLEANING APPARATUS

BACKGROUND OF THE INVENTION

1. Field of the Invention

The present invention generally relates to cleaning and drying of flexible conveyor structures, especially plastic chain conveyors, while in a running mode. More specifically, this invention relates to a plastic or other conveyor chain cleaning apparatus which can be installed into an existing chain conveyor so that the chain conveyor is continuously cleaned during normal operation.

2. Description of the Prior Art

Chain conveyors are used in many industrial installations and they frequently have various materials deposited thereon by the produce or products being conveyed which require that the conveyor be cleaned for proper operation. Food products when conveyed frequently leave residual material on the conveyor. Likewise, containers being conveyed under filled nozzles have material dripped thereon. Also, automotive parts may drip oil or grease onto the conveyor chain. Regardless of the source of contaminating material, it is necessary to periodically clean chain conveyors for proper operation of the conveyor.

It is also known to clean conveyor structures by utilizing various cleaning apparatuses including water and air manifolds combined with a scraper to clean the load surface of the conveyor chain or belt. The prior art also discloses structure for tapping the underneath surface of the conveyor belt combined with a water spray onto the load carrying surface of the conveyor belt. The prior art further discloses flush nozzles directed toward opposite surfaces of the conveyor belt as it is passing through a cabinet. In addition, the prior art discloses the use of tank baths, scrapers, nozzles and brush assemblies, and air nozzles for removing cleaning solution from the conveyor. The following U.S. patents disclose structures which are exemplary of the features known in the prior art as discussed above:

| | | |
|---|---|---|
| 1,793,246 | 3,578,151 | 5,031,750 |
| 2,216,304 | 3,819,032 | 5,058,728 |
| 2,855,094 | 4,960,200 | 5,355,992 |

While the prior patents disclose various arrangements for cleaning conveyor apparatuses, the prior art does not include the arrangement of components and the advantages derived from the arrangement of the components in this invention, especially adaptable for cleaning chain conveyors, and especially plastic chain conveyors, used to convey various products or produce which may deposit contaminating material on the chain conveyor.

SUMMARY OF THE INVENTION

In accordance with the present invention, a conveying chain, such as a plastic conveying chain, is subjected to a series of cleaning procedures including sets of high pressure solvent spray nozzles, sets of cleaning brushes to subject all surfaces of the conveyor chain to brush scrubbing action, a solvent bath and air nozzles for drying the chain. The cleaning brushes are preferably operated by a single motor. The cleaning apparatus includes a roller arrangement requiring the conveyor chain to move in a serpentine path to subject surfaces of the conveyor chain to more effective cleaning by the cleaning brush, engaged with the surfaces of the chain. The cleaning and drying apparatus utilizes sets of driven brushes to provide a scrubbing action on all surfaces of the chain and high pressure solvent spray to blast the surfaces of the chain to remove film and sediment. The brushes are kept clean during use by the solvent, and the air nozzles provide a drying action to minimize the amount of solvent left on the chain during the cleaning operation.

Therefore, it is a primary object of the present invention to provide a conveyor chain cleaning and drying apparatus, especially for plastic chain conveyors, which is operable while the conveyor chain is in a running mode with a return segment of the conveyor chain passing through an automatic chain cleaning and drying apparatus to remove particles of dirt, contamination and any sort of sediment that may have accumulated onto the plastic conveyor chain during normal use.

Another primary object of the present invention is to provide a cleaning apparatus as set forth in the preceding object in which the return segment of the chain passes through a closed tank where the return segment is subjected to a series of rotating brushes and high pressure solvent spray nozzles which impinge solvent on the chain and then returns to the underside of the conveyor system following completion of the cleaning operation.

More specifically, the components of the cleaning apparatus of the present invention are arranged so that the return run of the conveyor is first subjected to high pressure solvent sprayed on each course of the conveyor. The chain is then passed over and around brushes and a roller defining a serpentine path for the conveyor chain to scrub the conveying course of the conveyor in both a concave and a convex condition. Additional rotating brushes are then provided to engage all surfaces of the chain, and the chain is then moved past additional high pressure solvent spray nozzles, through a solvent bath in the tank, around an idler roller and upwardly out of the spray tank and finally past compressed air fed nozzles or air knives for removing residual water or solvent off of the chain prior to exit from the closed tank.

In light of the foregoing, a further object of the present invention is to provide a cleaning and drying apparatus in accordance with the preceding objects in which the scrubbing brushes preferably engage the top and bottom surfaces and both side edges of the conveyor chain and are driven by a single drive motor having a variable speed to vary the amount of scrubbing action as required.

A still further object of the invention is to provide a conveyor structure cleaning and drying apparatus in accordance with the preceding objects in which all of the scrubbing brushes engage the conveyor structure in a manner to exert a pulling force on the conveying structure thus eliminating introduction of pulsations.

Still another object of the present invention is to provide a cleaning and drying system for conveyor structures utilizing a unique structural arrangement for maintaining a liquid level in a solvent tank and utilizing a high pressure piston type pump combined with a pulsation dampener and a pressure relief valve supplying high pressure solvent to the spray nozzles which cleans the chain and maintains the brushes in a wet condition with the liquid solvent being discharged into the tank for recirculation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
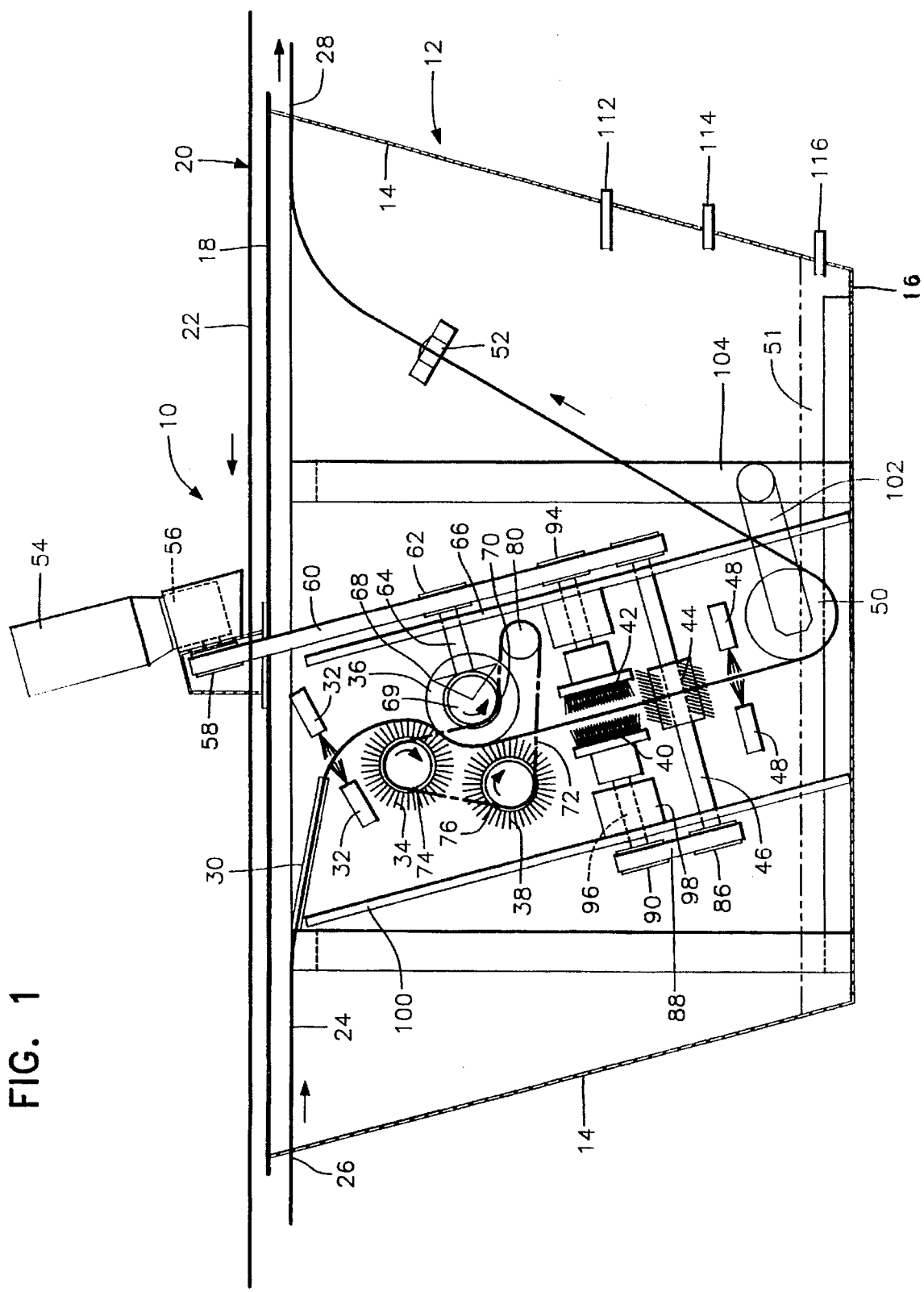
FIG. 1 is a schematic elevational view of a preferred cleaning and drying apparatus for a plastic conveyor chain in accordance with the present invention which illustrates the association of the brushes, spray nozzles, guide rollers and air knives located within a solvent tank.
Figure 2:
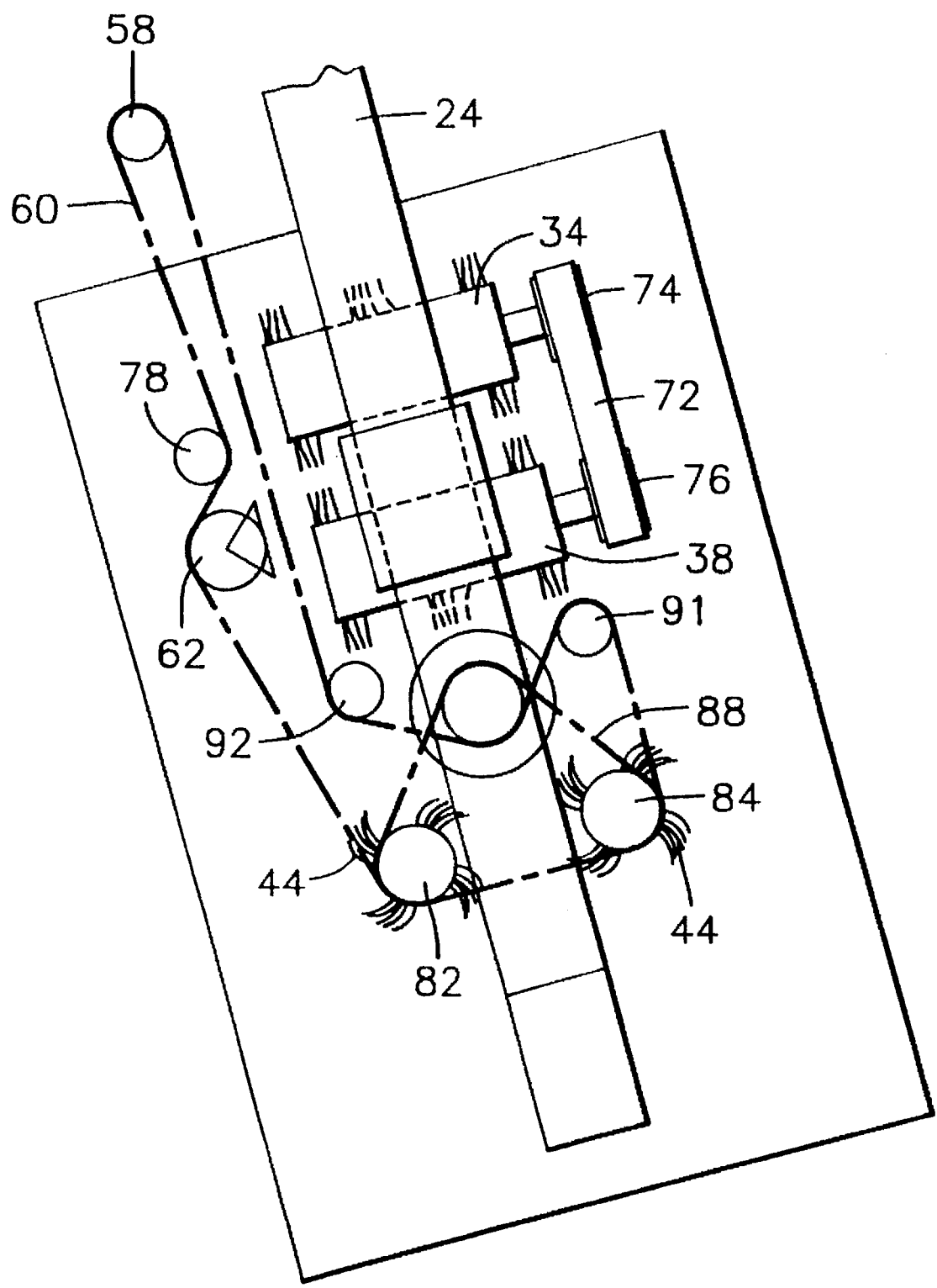
FIG. 2 is a schematic illustration of the drive belts for the cleaning brushes driven from a single motor located above the solvent tank for the apparatus of FIG. 1.
Figure 3:
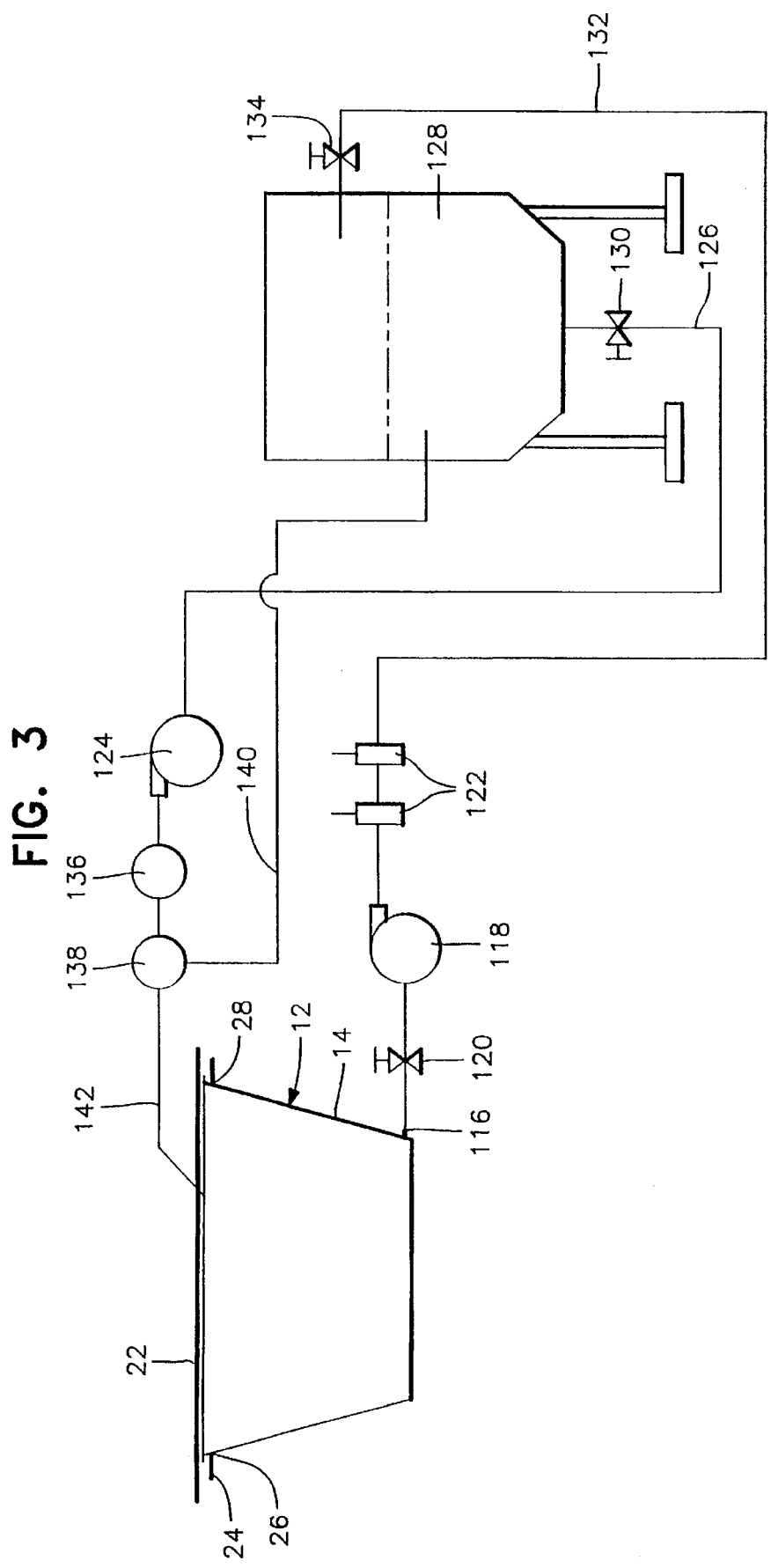
FIG. 3 is a schematic view illustrating the components of the overall system for providing high pressure cleaning solvent to the cleaning and drying apparatus of this invention.

Referring now to FIGS. 1–3 of the drawings, one embodiment of the cleaning and drying apparatus of this invention is designated generally by the reference numeral 10 and includes a tank 12 provided with peripheral side walls 14, a bottom 16 and a top 18 forming a closure for the tank. The tank is associated with a conventional conveying structure in the form of a plastic conveyor chain 20 or other conveyor structure, conveyor belt or the like. Exemplary plastic chain conveyors are those known in the industry and marketed under the tradename "FlexLink". Conveyor chain 20 has an upper conveying segment 22 positioned above the top 18 of the tank and a return segment 24 moving in the direction of the arrows in FIG. 1. The return segment 24 enters the tank at 26 immediately below the top wall 18 and exits the tank at 28 in order that the conveyor chain 20 can be effectively cleaned while in a running mode.

The return segment 24 of the conveyor chain 20 is engaged with a guide 30 which is downwardly inclined and directs the return segment 24 between a pair of opposed high pressure solvent spray nozzles 32 which are directed toward the upper and lower surfaces of the conveyor chain 20. The return segment 24 of the conveyor chain 20 then passes downwardly and over the external surface of a cleaning brush 34 which engages the top surface of the conveyor chain 20. The return segment 24 of the conveyor chain 20 then passes over a backup support roller 36 which is in opposed relation and slightly below the brush 34. The return segment 24 then passes over the external surface of another top surface scrubbing brush 38 which is below the brush 34 and oriented in opposed relation to the peripheral surface of the support roller 36.

The brushes 34 and 38 and the support roller 36 are all cylindrical in shape and have a width greater than the width of the conveyor 20. The roller 36 is preferably positioned to hold the conveyor chain against the brushes 34 and 38 for effectively scrubbing the top surface of the conveyor chain 20 at two spaced areas simultaneously. The solvent discharged from the nozzles 32 cleans both surfaces of the conveyor chain and also discharges solvent onto the brushes 34 and 38, thus keeping the brushes lubricated and themselves under a cleaning action. As illustrated in FIG. 1, the path of the return segment 24 of the conveyor chain 20 is generally serpentine along the external surfaces of the brush 34, the support roller 36 and the brush 38. As such, brush 34 scrubs the conveying (upper) surface of chain 20 while in a concave shape, and brush 38 scrubs the conveying surface while in a convex shape, thus providing for better and more thorough cleaning.

The return segment 24 of the conveyor chain 20 then passes downwardly between rotatably driven surface brushes 40 and 42 which counter-rotate and engage the top and bottom surfaces of the conveyor chain 20. The brushes 40 and 42 are of circular configuration with a diameter approximately, but slightly greater than, the width of chain 20. The axis of rotation of the brushes 40 and 42 is preferably perpendicular to the top and bottom surfaces of the conveyor chain 20 whereas the rotational axis of the brushes 34 and 38 is preferably parallel to the top surface of the conveyor chain.

As the return segment 24 of the conveyor chain exits from contact with the brushes 40 and 42, it continues downwardly in an inclined path toward the bottom 16 of the tank 12. The side edges or surfaces of segment 24 are engaged by side edge brushes 44 each of which is supported on a shaft 46 which, along with the supported brush on each shaft, extends perpendicular to the conveyor chain 20 in spaced relation to the side edges or surfaces thereof. The conveyor chain 20 then passes between a second set of high pressure solvent spray nozzles 48 and then passes under and around an idler takeup roller 50 located so that the return segment 24 of conveyor chain 20 passes through a bath of liquid solvent 51 in the bottom of the tank 12.

The return segment 24 of the conveyor chain 20 then extends upwardly from the takeup idler roller 50 between a set of compressed air nozzles or knives 52 which remove residual water or solvent from the chain. Alternatively, high velocity blowers or the like, with or without an auxiliary heating element, can be employed instead of air nozzles to remove the residual water or solvent from the chain. The return segment 24 then exits at 28 with an inclined guide structure or guide roller (not illustrated) provided for aligning the conveyor chain with the exit opening at 28. Once the conveyor chain has passed through the air knives 52, it will go back into the upper segment of the conveyor system and all surface areas of the conveyor chain or conveying structure have been effectively cleaned and dried.

Numerous solvents are useful in the present invention, and any solvent capable of cleaning the accumulating debris and residual material which builds up on the chain from the conveyor function can be used. Without being limiting, this includes water and any of the many known water-based and petroleum-based solvents, degreasers and the like.

As illustrated in FIGS. 1 and 2, the brushes and roller 36 are all powered by a single drive motor 54 preferably located on the top of tank 12, or at some other convenient location outside of the tank. The drive motor 54 has a gear head 56 driving an output pulley 58 and a drive belt 60 in engagement therewith. As illustrated in FIG. 1, the drive belt 60 engages a pulley 62 on drive shaft 64 journalled on a support member 66 with a bevel gear 68 on the inner end thereof drivingly engaging a corresponding bevel gear 69 connected with the roller 36. The roller 36 includes a pulley 70 drivingly engaging a belt 72 that is drivingly engaged with pulleys 74 and 76 connected to the brushes 34 and 38, respectively. Thus, the brushes 34 and 38 are driven in the same rotational direction as the rotational direction of the support roller 36 as shown by arrows in FIG. 1 to impart a pulling force on the conveyor chain. In this regard, the periphery of the roller 36 which engages the return segment 24 moves it downwardly while the periphery of brushes 34 and 38 engaging the top surface of the conveyor chain has bristles also pulling the chain in a downward direction.

The drive belt 60 also engages an idler roller 78 between the drive pulley 58 and the pulley 62 for driving the roller 36. An idler pulley 80 is engaged by the belt 72 to act as a takeup roller to maintain the belt 72 taut with respect to the pulleys 70, 74 and 76 which it engages.

The drive belt 60 engaging the pulley 62 also extends downwardly into engagement with pulleys 82 and 84 connected to the two shafts 46 having the brushes 44 thereon which engage the side edges of the return segment 24 of the conveyor chain 20. The opposite end of each shaft 46 has a pulley 86 thereon which is enengaged by a drive belt 88 that extends upwardly to engage over a drive pulley 90 on the brush 40. The drive belt 60 which engages the pulleys 82 and 84 extends around idler pulleys 91 and 92 oriented on opposite sides of the return segment of the belt 60. Belt 60 then extends underneath a drive pulley 94 connected with the brush 42 for driving the brush 42 in a counter-rotating direction from the rotating direction of brush 40. The brushes 40 and 42 are supported on shafts 96 journalled in bearings 98 which are supported by support members 66 and 100. The shafts 46 which support the edge brushes 44 are likewise journalled from the support members 66 and 100. This structure enables all of the brushes 34, 38, 40, 42 and 44 as well as roller 36 to be driven from single motor 54. Three belts are used with belt 60 being the main drive belt, and belt 72 driving the brushes 34 and 38 from the roller 36 and the belt 88 driving the brush 40.

The idler takeup roller 50 is driven by contact with the conveyor chain 20 and is supported by a pivotal arm 102. Arm 102 is pivotally supported from any convenient frame structure such as upright support 104. In this manner, roller 50 serves to guide the conveyor chain 20 through the bath of liquid solvent 51 in the bottom of tank 12 and to maintain the return segment 24 of the conveyor chain under a desired tension.

Figure 4:
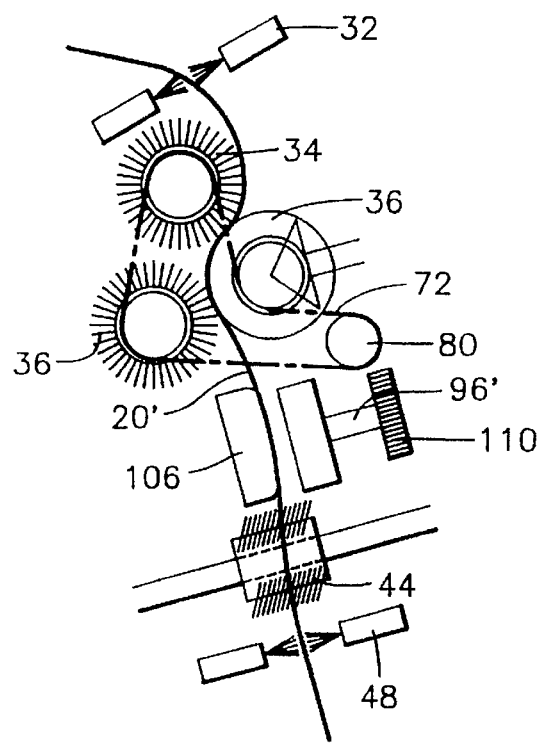
FIG. 4 is a fragmental side elevational view of an alternate arrangement of brushes which introduce only a pulling force to the conveyor chain in accordance with the present invention.
Figure 5:
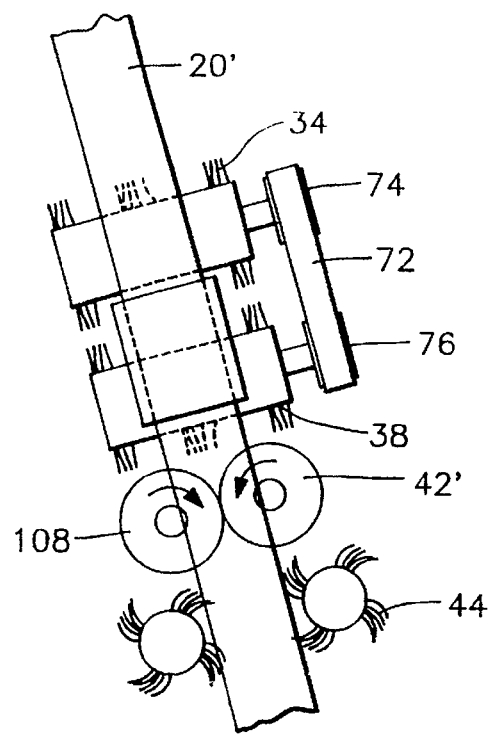
FIG. 5 is a fragmental plan view of the embodiment of FIG. 4.

FIGS. 4 and 5 illustrate an alternate embodiment of the present invention in which all of the brushes are rotated to impart a pulling force on the conveyor chain to eliminate the possible introduction of pulsation producing forces into the conveyor. Such pulsation forces sometimes can occur when some of the brushes engage the chain in a manner to impart a force which is in a direction opposite to the direction of chain movement. In this embodiment of the invention, the brush 40 which engages the top surface or face of the conveyor chain 20' has been removed and replaced with a curved backing support 106 made of plastic or the like. On the opposite or bottom surface of the chain 20', a second brush 108 has been added alongside brush 42', and both brushes are oriented so that the brushes 42' and 108 engage the complete bottom surface of the conveyor chain 20' as illustrated in FIG. 5. The brushes 42' and 108 counter-rotate by the use of a pair of meshing spur gears 110 on supported shafts 96' by a pulley engaged with the drive belt 60. As shown in FIG. 5, the counter-rotating brushes 108 and 42' will impart a pulling force to the conveyor chain 20'.

The tank 12 is provided with a high level fluid switch 112 (see FIG. 1) and a low level fluid switch 114 and an outlet 116 to a centrifugal circulating pump 118. The high and low level switches operate centrifugal pump 118 with a manual cutoff valve 120 being provided between the pump 118 and the tank 12. From the pump 118, solvent fluid from the tank 12 passes through a set of filters 122 which remove any particles in the fluid prior to entering a high pressure pump 124 which has an inlet line 126 connected to a fluid holding tank 128 through a valve 130. The holding tank 128 serves to release heat which is developed from the high pressure pump 124 and nozzles 32 and 48. Fluid is fed into the storage tank 128 by discharge line 132 from the pump 118 and through a valve 134. Preferably, gravity flow can supply the solvent fluid from the storage tank 128 to the high pressure pump 124. While high pressure piston pumps which can produce a pressure in the range of 1,000 to 1,500 psi are preferred for pump 124, other type pumps such as centrifugal pumps, gear pumps and the like, can be used in the present invention depending on the type of solvent fluid to be delivered to the nozzles 32 and 48.

After leaving the pump 124, the fluid passes preferably through a pulsation dampener 136 and then through a pressure relief valve 138 with any excess pressure being returned to the tank 128 through a return line 140. The pulsation dampener 136 removes or dampens pulsation peaks in the flow from the piston pump and the pressure relief valve provides safety in operation and regulates the overall pressure in the system. After passing through the pressure relief valve 138, the high pressure fluid passes through line 142 to the spray tank 12 into a manifold which feeds the solvent nozzles 32 and 48. The solvent engages the brushes as it falls into the tank and as the wet conveyor chain engages the brushes to maintain the brushes in a clean and lubricated condition.

While it is preferred to contact all sides of the conveyor chain with scrubbing brushes, there may be circumstances where all of the brushes shown in the preferred embodiments will not be necessary, and only two scrubbing brushes will suffice. For example, only brushes 34 and 38 may be used with backup roller 36 to scrub only the conveying surface, or brush 34 with roller 36 may be used with brushes 42' and 108 to scrub both top and bottom surfaces of the conveyor.

Further, the foregoing is considered as illustrative only of the principles of the invention. Numerous other modifications and changes will readily occur to those skilled in the art depending upon the application and the conveyor chain to be cleaned. Therefore, it is not intended to limit the invention to the exact construction and operation shown and described, and all suitable modifications and equivalents may be resorted to which fall within the scope of the invention.

What is claimed as new is as follows:

1. A cleaning apparatus for a flexible conveyor structure comprising a plurality of high pressure spray nozzles subjecting a moving segment of the conveyor structure to a cleaning solvent, a plurality of rotatable, driven brushes in contacting scrubbing relation to opposed surfaces of the moving segment of the conveyor structure and a bath of cleaning solvent through which the moving segment of the conveyor structure passes subsequent to being scrubbed by said brushes.

2. The cleaning apparatus as defined in claim 1 wherein at least some of said brushes being driven to exert a pulling force on the conveyor structure.

3. A cleaning apparatus for a flexible conveyor structure comprising a plurality of high pressure spray nozzles subjecting a moving segment of the conveyor structure to a cleaning solvent, a plurality of brushes in contacting scrubbing relation to all surfaces of the moving segment of the conveyor structure and a bath of cleaning solvent through which the moving segment of the conveyor structure passes subsequent to being scrubbed by said brushes, said brushes including a pair of parallel horizontal cylindrical brushes oriented in spaced relation in engagement with one surface of said moving segment of the conveyor structure, means rotatably driving said cylindrical brushes, a backup roller oriented horizontally and engaging an opposite surface of said moving segment of the conveyor structure in an area between the cylindrical brushes thereby causing the brushes to engage the moving segment of the conveyor structure in a concave condition and a convex condition for more effective scrubbing action of the brushes on the conveyor structure.

4. The cleaning apparatus as defined in claim 1 wherein all of said brushes, all of said nozzles and said bath of solvent are positioned in a tank through which said moving segment of the conveyor structure passes.

5. The cleaning apparatus as defined in claim 1 together with air nozzles above the solvent bath directed toward the moving segment of the conveyor structure for removing residual solvent on the conveyor structure after it passes through the solvent bath.

6. The cleaning apparatus as defined in claim 3 wherein said spray nozzles include a pair of nozzles directing solvent toward opposed surfaces of the conveyor structure above the cylindrical brushes to remove contaminants and discharge solvent onto the cylindrical brushes for cleaning the cylindrical brushes.

7. The cleaning apparatus as defined in claim 6 wherein said brushes include a pair of brushes rotatably driven about an axis perpendicular to opposed surface of the conveyor structure, said brushes rotatable about an axis perpendicular to said conveyor structure being in scrubbing engagement with opposed surfaces of the moving segment of the conveyor structure.

8. The cleaning apparatus as defined in claim 7 wherein said opposed surfaces of the conveyor structure are the side edges of a conveyor structure.

9. The cleaning apparatus as defined in claim 7 wherein said opposed surfaces of the conveyor structure are the upper and lower surfaces of the conveyor structure.

10. The cleaning apparatus as defined in claim 9 wherein said brushes also include a pair of parallel opposed brushes in scrubbing engagement with side surfaces of said conveyor structure.

11. The cleaning apparatus as defined in claim 10 wherein said spray nozzles include a pair of high pressure nozzles discharging solvent on the conveyor structure below said pair of brushes engaging side surfaces of said conveyor structure.

12. The cleaning apparatus as defined in claim 11 together with a tank below said brushes engaging side surfaces of the conveyor structure, said tank including a bottom portion receiving said solvent bath and an idler roller engaging the moving segment of the conveyor structure to guide the moving segment below a top surface of the solvent bath.

13. A cleaning apparatus for a flexible conveyor structure comprising a plurality of high pressure spray nozzles subjecting a moving segment of the conveyor structure to a cleaning solution, at least two rotatable driven brushes in contacting scrubbing relation to the moving segment of the conveyor structure below said spray nozzles and compressed air nozzles directed toward the moving segment of the conveyor structure after scrubbing by said rotatable brushes for drying the conveyor structure after it has been cleaned.

14. The cleaning apparatus as defined in claim 13 wherein said brushes are driven to exert a pulling force on the conveyor structure.

15. The cleaning apparatus as defined in claim 13 wherein said brushes include a pair of parallel horizontal cylindrical brushes oriented in vertically spaced relation in engagement with one surface of said moving segment of the conveyor structure, a backup roller oriented horizontally and engaging an opposite surface of said moving segment of the conveyor structure in an area between the cylindrical brushes thereby causing the moving segment of the conveyor structure to move in a serpentine path for more effective scrubbing action of the brushes on the conveyor structure.

16. The cleaning apparatus as defined in claim 15 wherein said spray nozzles include a pair of nozzles directing cleaning solution toward opposed surfaces of the conveyor structure above the cylindrical brushes to remove contaminants and discharge cleaning solution onto the cylindrical brushes for cleaning the cylindrical brushes.

17. The cleaning apparatus as defined in claim 13 wherein said brushes include a pair of brushes rotatable about an axis perpendicular to and in scrubbing engagement with opposed top and bottom surfaces of the conveyor structure.

18. A cleaning apparatus for a flexible conveyor structure comprising a plurality of high pressure spray nozzles subjecting a moving segment of the conveyor structure to a cleaning solvent, a plurality of rotatable brushes in contacting scrubbing relation to at least one surface of the moving segment of the conveyor structure, said brushes include a pair of parallel horizontal cylindrical brushes oriented in vertically spaced relation in engagement with one surface of said moving segment of the conveyor structure, a backup roller oriented horizontally and engaging an opposite surface of said moving segment of the conveyor structure in an area at least partially between peripheral surfaces of the cylindrical brushes thereby causing the moving segment of the conveyor structure to move in a serpentine path for more effective scrubbing action of the brushes on the conveyor structure, said nozzles including spray nozzles subjecting the moving segment of the conveyor structure to a cleaning solution before and after passing said brushes.

* * * * *